April 23, 1957 F. G. ZICK 2,789,906
METHOD OF AMMONIATING CATTLE FEED
Filed Dec. 1, 1954
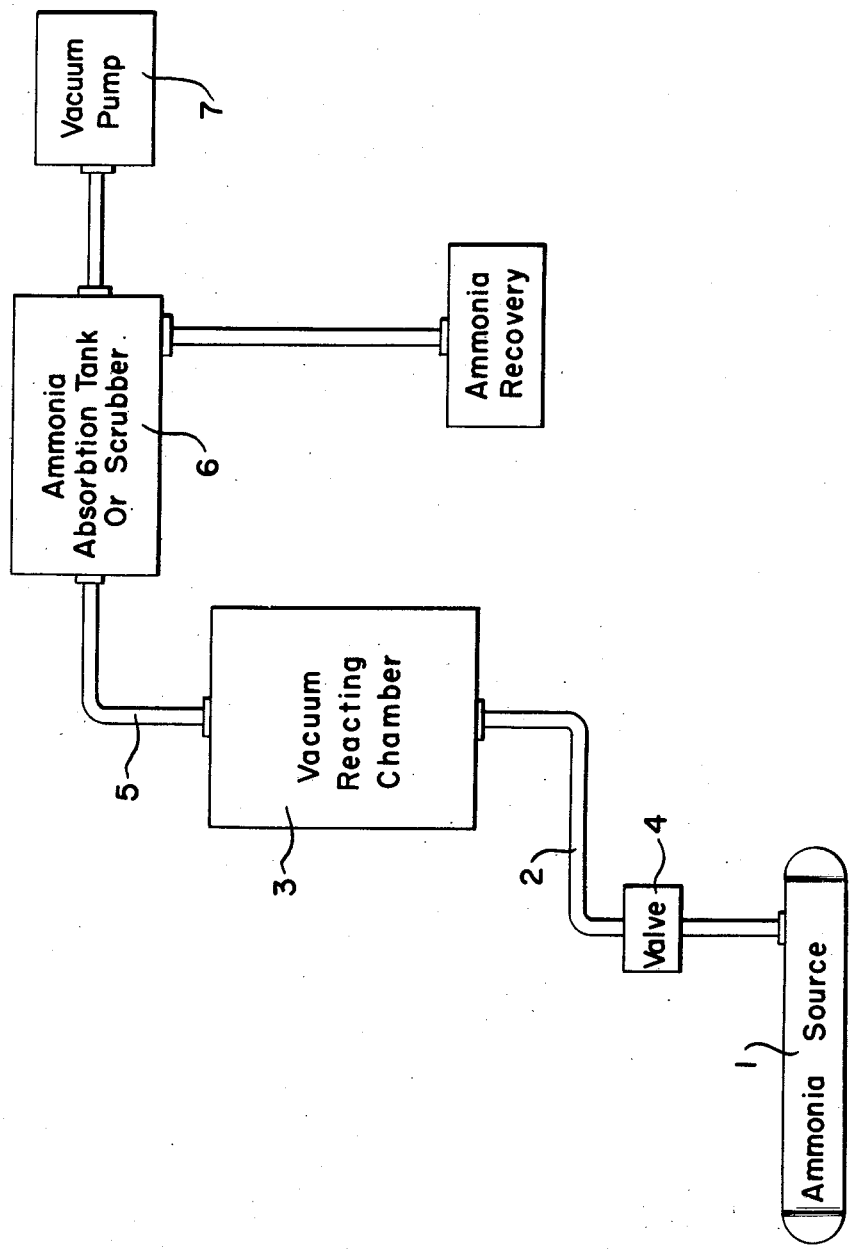
INVENTOR
Francis G. Zick
BY
ATTORNEYS

2,789,906

METHOD OF AMMONIATING CATTLE FEED

Francis G. Zick, Newton, N. J.

Application December 1, 1954, Serial No. 472,384

7 Claims. (Cl. 99—2)

This invention relates to an improved method of treating agricultural waste or roughage materials for the production of cattle feed. More particularly, the invention relates to the treatment of agricultural waste or roughage materials with anhydrous ammonia under subatmospheric conditions to produce ammoniated cattle feed.

Agricultural roughage materials resulting from the processing of foods are abundant, and many problems are presented in disposing of or using these materials. Such roughage has heretofore been used as cattle feed, but it is undesirably low in protein content. Cattle so fed lack sufficient protein and results in poor growth of the cattle unless the roughage is supplemented by an expensive protein food. Since ruminants can utilize ammonia or ammonia compounds as a substitute for protein and nitrogen compounds by converting it into available protein, attempts have been made to ammoniate certain agricultural roughage or waste materials to produce a cattle feed high in available protein. Prior methods of ammoniating agricultural roughage have been undesirably inefficient and costly.

According to the present invention, agricultural roughage materials are treated with anyhdrous ammonia under a vacuum or subatmospheric pressure in a closed reacting chamber. The vacuum draws the anhydrous ammonia gas through the roughage material in the reaction chamber and reacts with the roughage as it passes through the chamber. The anhydrous ammonia gas is preferably fed to the bottom of the reaction chamber. I have found also that it is advantageous to tightly pack the roughage material before subjecting the same to treatment with anhydrous ammonia gas. The application of the vacuum to the roughage material in the closed chamber prior to any reaction with the anhydrous ammonia gas draws the roughage materials together. The release of the vacuum again subjects the roughage to atmospheric pressure and serves to tightly pack the roughage materials together. The roughage materials could also be tightly packed by other methods such as by direct pounding of the roughage into the chamber, however, the vacuum is considered to be more advantageous as it more effectively removes the air from the roughage materials. The use of a tightly packed reaction chamber results in a faster and more efficient reaction between the anhydrous ammonia gas and the agricultural roughage materials.

The process of the present invention provides a more efficient and less costly process for ammoniating agricultural roughage materials. The use of a vacuum results in a more complete reaction between the anhydrous ammonia gas and the agricultural roughage without the interference of air particles. No useless work is done by the ammonia gas, and more work can be done in less time with less consumption of gas than could be accomplished by prior processes. Another advantage of the process of the present invention is that the reaction takes place in a closed system and the ammoniating reaction takes place without the discomfort of any gas leaking into the room. Nor is there any escape of gas after completion of the reaction from the reaction chamber and when the chamber is opened to remove the ammoniated product. Still another advantage of the present invention resides in the fact that the reaction is complete the instant the anhydrous ammonia gas passes through to the end of the reaction chamber. This point in the process may easily be determined for as the ammonia begins to enter the line to the vacuum pump, the vacuum reading shown on the gauge will immediately drop several points. This is an indication that the ammonia has passed through the reacting chamber and that the reaction is complete. The gas may then be shut off. Another advantage of the present invention is that the use of the vacuum slows down the rate of reaction between the agricultural roughage materials and the anhydrous ammonia gas resulting in a more complete and economical process.

Various types of agricultural roughage or waste materials may be ammoniated according to the process of the present invention. For example, I have successfully ammoniated apple pomace, dried coffee grounds, dried orange pulp, dried grape pulp, dried grapefruit pulp, molasses, trub, dried brewer's yeast, cottonseed oil meal, linseed oil meal, and the like.

Agricultural roughage materials generally contain a large proportion of water which renders them difficult to handle. Processes have been developed to dry agricultural roughage materials to reduce the water content for ease in handling and reacting. For example, one known method of drying agricultural roughage materials is by admixing lime therewith, grinding it, permitting it to stand, then pressing the roughage to remove a large proportion of the water, and then drying the remaining residue. Even with such an expensive drying step, however, the roughage materials still usually contain about 10–20% moisture. It is an advantage of the process of the present invention that agricultural roughage materials may be treated either as the so-called dry roughage or in their original state while they still contain a very high percentage of water. In each case products are produced having comparable properties, such as protein equivalent content, while maintaining the more efficient and less costly features of the process of the present invention.

Anhydrous liquid ammonia may be used as a source of ammonia gas, or anhydrous ammonia gas may be used directly. When liquid anhyrous ammonia is utilized, it is readily converted into gas in the reacting chamber due to the pressure and temperature conditions maintained therein for reacting the roughage materials according to the present invention, or it may be converted into anhydrous gas prior to entering the reaction chamber. The amount of anhydrous ammonia necessary to complete the reaction will of course vary depending on the amount and type of roughage material to be ammoniated. As hereinbefore pointed out, the anhydrous ammonia source may be cut off when the ammonia reaches the opposite end of the reacting chamber, and the amount of ammonia necessary to complete the reaction may easily be determined by observation.

The subatmospheric pressure utilized in the reacting chamber according to the process of the present invention may be varied within rather wide limits. For example, I may use approximately 10 or 20 inches of vacuum or below or as high as 29.91 inches of vacuum or higher and maintain the unique reaction and advantages of the present invention. The use of the lower vacuum, however, prolongs the reaction time and the use of the higher vacuum necessitates more expensive equipment. I have found that it is advantageous both from a reacting and economical standpoint to maintain approximately 29.91 inches of vacuum in the chamber prior to and during the reaction of the roughage material. Although due to the differential in pressure between the anhydrous ammonia gas source and the reacting chamber the gas will readily flow into the reacting chamber when permitted, I have also found that it is advantageous to feed the gas into the reaction chamber at a pressure slightly above atmospheric. About 10 pounds gauge pressure has been found to be advantageous when utilizing a subatmospheric pressure in the reacting chamber of approximately 29.91 inches of vacuum.

The reaction of the agricultural roughage materials with the anhydrous ammonia gas is an exothermic reaction and I have found that the evolution of heat from this reaction is in itself sufficient and no external heat is required. I have found, however, that it is advantageous to heat the reacting chamber, by any suitable means to a temperature of about 70° C. prior to introducing the anhydrous ammonia gas to cause reaction with the roughage material. When no external heat is utilized, the reaction time is somewhat longer. For example, in reacting 184 grams of apple pomace with anhydrous ammonia being fed under 10 pounds gauge pressure to a reacting chamber under 29.91 inches of vacuum with no application of heat and having an original temperature of 32° C., the time required to complete the reaction was about 6 minutes. During the reaction the temperature rose from 32° C. to 50° C. Under the same conditions, but with the reaction chamber preheated to a temperature of 71° C. by an external source, the time for completing the reaction was only 2 minutes and the temperature rose from 71° C. to 91° C. during the reaction. The use of temperatures much in excess of about 70° C. under the same conditions as noted above, does not materially decrease the reacting time.

Another advantage of the present invention is that the equipment required for carrying out the process is relatively simple and inexpensive. As shown in the diagrammatic drawing, a suitable source of anhydrous ammonia is shown at 1, with a lead 2 for the gas leading to the vacuum reacting chamber 3. A valve 4 is located between the reacting chamber and the ammonia source for regulating the amount and rate of ammonia admitted to the reacting chamber as the ammonia passes up through the reacting chamber and reacts with the agricultural roughage material placed therein, it passes through the lead 5 and into an ammonia absorption tank 6 to prevent the ammonia gas from entering the vacuum pump 7 and also for the economical expedient of recovering the unused ammonia which may again be utilized.

*Example 1*

Apple pomace was first ground and packed in a reacting chamber. The bottom end was sealed and an outlet for a vacuum pump attached to the top of the reacting chamber. Approximately 29.91 inches of vacuum were then applied for a short period of time and released, and the top connection of the reacting chamber was then freed. This enabled the atmospheric pressure to pack the apple pomace tightly down into the reacting chamber. More apple pomace was then added to the free space at the top of the reacting chamber and approximately 29.91 inches of vacuum again applied to the reaction chamber. The total weight of apple pomace packed into the chamber was 6.6 pounds. Anhydrous ammonia gas under 10 pounds gauge pressure was then admitted to the bottom of the reacting chamber. The starting temperature of the apple pomace was 23° C., and approximately 29.91 inches of vacuum were maintained in the reacting chamber during the reaction. After 30 minutes the anhydrous ammonia gas reached the line to the vacuum pump and the reading on the vacuum gauge dropped several points. The gas was then turned off and the final temperature of the apple pomace was 62° C. The original pH of the apple pomace was 3.7 and the final pH 9.6. The fat content of the pomace remains unchanged at 5 percent. The apple pomace had an original $N_2$ content of 0.93% and a final $N_2$ content of 3.2% to 3.5%. On a protein basis, calculated by $N_2 \times 6.25$, the original protein content was 5.8% and the final protein content was about 19.95%. The reaction between the ammonia and the apple pomace was clearly visible, and there was a visible darkening of the color of the apple pomace as the anhydrous ammonia reacted with it. The visible darkening and reaction of the roughage materials are characteristics of the present invention.

*Example 2*

Five pounds of beet residue were charged into a vacuum reacting chamber and the residue tightly packed therein using 29.5 inches of vacuum. Anhydrous ammonia gas was then passed into the reacting chamber from the bottom. The reaction proceeded slowly and the color of the beet residue changed from gray to pale green and the pale green color persisted after the reaction was completed. The pH of the beet residue prior to reacting the same was 4.4 and rose to 9.3 after the reaction. The total protein equivalent nitrogen increased from 7 per cent to over 11 per cent.

*Example 3*

Trub, which is a by-product resulting from the brewing of beer and appearing as the haze or flock in the wort as a result of boiling or cooling, was placed in a reaction vessel and subjected to a subatmospheric pressure of about 29.91 inches of vacuum. Trub, as it comes from the brewery contains about 80 per cent water and thus in this instance it was found to be necessary to place a trap at the end of the reacting vessel to catch the water sucked from the trub to prevent it from entering the vacuum pump. Anhydrous ammonia gas was then fed into the reacting vessel at room temperature. The reaction proceeded slowly with a clearly visible color change. When the ammonia gas reached the end of the reacting vessel, the gas was shut off. The pH of the trub rose from 4.5 before the reaction to 10.5 after the reaction.

Trub, which had been previously dried has also been ammoniated as in the above example and in this case the pH rose from 4.9 before the reaction to 9.4 after the reaction.

I claim:

1. The process of preparing ammoniated livestock feed from agricultural roughage which comprises placing said roughage in a closed container, creating a vacuum in said container to withdraw gases from said roughage, maintaining said vacuum and introducing anhydrous ammonia into said container.

2. The process according to claim 1 in which the vacuum is 29.91 inches.

3. The process according to claim 1 in which the temperature is 70° C.

4. The process according to claim 1, in which the addition of ammonia is continued until there is a sharp rise in pressure and the introduction is then discontinued and the vacuum broken.

5. The process in accordance with claim 3 in which the roughage is compacted by means of the vacuum before introduction of the ammonia.

6. The process of preparing ammoniated livestock feed from agricultural roughage materials which comprises packing the roughage material in a closed reaction chamber, subjecting the chamber to a vacuum to draw the roughage materials together, releasing the vacuum and subjecting the roughage to atmospheric pressure to tightly pack the roughage in the reaction chamber, again subjecting the roughage material to a vacuum and treating the roughage material while under the vacuum with anhydrous ammonia gas to produce an ammoniated livestock feed.

7. The process of claim 6 in which the vacuum was about 29.91 inches of vacuum.

References Cited in the file of this patent

UNITED STATES PATENTS

| | | |
|---|---|---|
| 2,293,845 | Millar | Aug. 25, 1942 |
| 2,603,567 | Stiles | July 15, 1952 |
| 2,641,542 | Ulrey | June 9, 1953 |